Feb. 19, 1924.
C. M. CUSICK
1,484,350
VALVE PACKING
Filed April 10, 1922
Fig. 1.
Fig. 2.
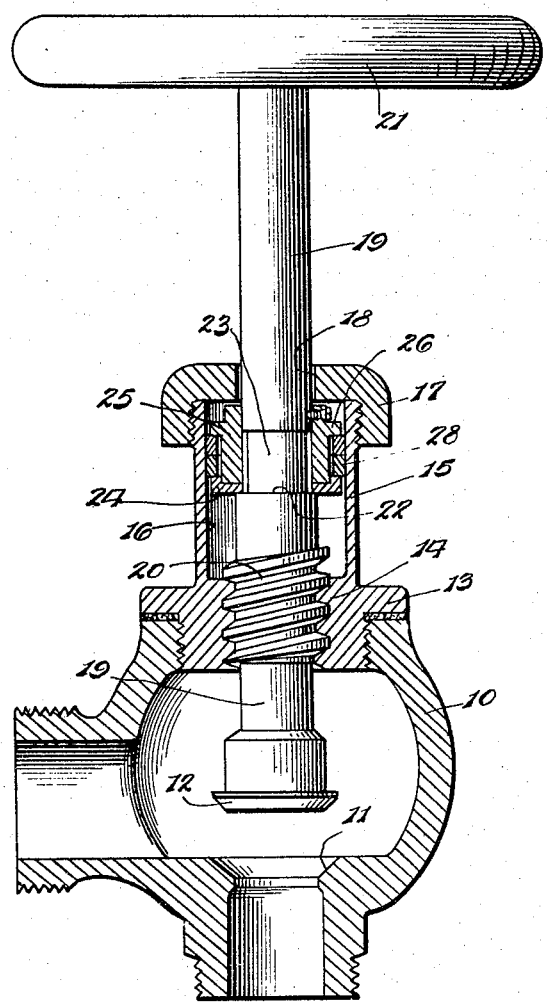
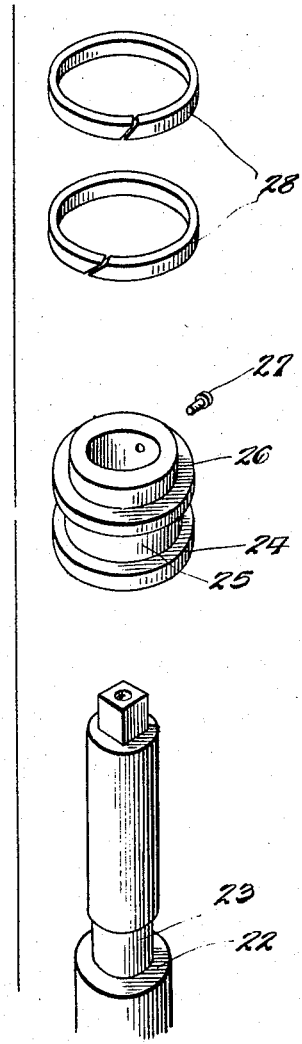
Inventor
C. M. Cusick.
By Lacey & Lacey, Attorneys Patented Feb. 19, 1924.

1,484,350

UNITED STATES PATENT OFFICE.

CHARLES M. CUSICK, OF STEUBENVILLE, OHIO.

VALVE PACKING.

Application filed April 10, 1922. Serial No. 551,357.

*To all whom it may concern:*

Be it known that I, CHARLES M. CUSICK, citizen of the United States, residing at Steubenville, in the county of Jefferson and State of Ohio, have invented certain new and useful Improvements in Valve Packings, of which the following is a specification.

My invention relates to improvements in valves and has for its object to provide a packing for the valve stem to prevent leakage.

It is customary to use leather or other soft packing material and to pack it tightly around the valve stem by means of spring or nut pressure. This causes the closing and opening of the valve to work extremely hard. In order to overcome this disadvantage I construct a valve with a packing which, although it at all times provides a tight joint, does not unduly restrain the operation of the valve. For this purpose I use expansible metallic packing rings around the valve stem without any axial compression on the rings whatever and, in this manner, avoid the undesirable friction on the stem.

In the accompanying drawing, in which one embodiment of the invention is illustrated:

Figure 1 shows an axial section of the valve, and

Figure 2 perspective views of the details.

The reference numeral 10 denotes an ordinary valve housing with a seat 11 for a conical valve head 12. My device, however, is equally well suited for any other kind of valves, such as gate valves or flap valves. A bonnet 13 is screwed down tightly in the housing in the usual manner and has an inner threaded portion 14 and an upwardly extending hollow shank 15 providing a cylindrical chamber 16. The free end of the bonnet 15 is closed by means of a cap 17 threaded thereon and provided with an opening 18 for the valve stem 19.

The valve head 12 is rigidly or revolubly attached to the valve stem 19, having threads 20 engaging the threaded portion 14 of the bonnet. The stem is continued upwardly through the opening 18 of the cap and carries at its free end a hand wheel 21 keyed thereon for operating the valve.

A short distance above the threads 20, the stem has a shoulder 22 and a narrow neck 23. On this shoulder a washer 24 is supported and a retaining bushing 25 engages in the recessed portion formed within the upstanding flange around the edge of the washer 24. The bushing has a collar 26 near its upper end and is secured, by means of a taper pin or set screw 27, on the stem 19.

Between the flange 26 and the washer 24 two or more split metallic rings 28, preferably of brass or bronze, are retained. These rings are so constructed that they fit loosely on the cylindrical portion of the bushing 25 and have to be slightly compressed into the chamber 16 so as to give radial pressure against its cylindrical surface. It will be noted that no axial pressure on the rings is exerted by the bushing 25 and that, therefore, no binding between the bushing 25 and the washer 24, on the one hand, and the rings 28 on the other hand, is possible, more particularly as the bushing and the washer are made of steel. Consequently, when the valve 19 is turned by means of the hand wheel 21, the bushing and the washer 24 turn with it while the rings 28 do not revolve but only obtain an axial movement in the chamber 16 as the screw 20 works up or down for opening or closing the valve. It will thus be seen that a perfect joint is provided between the rings and the bonnet and that no leakage around the rings is possible. Nor is there any leakage possible around the stem 19, as the small diameter of the neck 23 provides a space between the same and the bushing 25, in which oil or other liquid will collect. In order to simplify manufacture, the neck 23 and shoulder 22 may be omitted in the valve stem 19.

Having thus described the invention, what is claimed as new is:

1. In a valve having a housing, a valve stem and a bonnet in which said stem is guided, said bonnet having a cylindrical chamber; an elastic packing around said stem adapted to slide axially in said chamber while said stem is being advanced or retracted therein, said elastic packing comprising split metallic packing rings fitting tightly in the chamber, a shoulder on said stem, a washer resting on said shoulder, a retaining member inserted between said stem and said rings and engaging with said washer, a flange on said member, said flange and said washer confining said rings between them, and means for locking said member on said stem, a narrow neck being formed adjacent said shoulder on said stem providing a liquid retaining space between it and said member.

2. In a valve having a housing, a valve stem and a bonnet in which said stem is threaded, said bonnet having a cylindrical chamber around said stem; a packing for said stem comprising split metallic rings fitting tightly in said chamber, a washer and a retaining bushing confining said rings between them in axial direction, and means for locking said washer and bushing rigidly to said stem, a shoulder being formed on said stem for supporting said washer, and a space being formed adjacent said shoulder between said bushing and said stem thereby providing a liquid retaining space around the stem.

In testimony whereof I affix my signature.

CHARLES M. CUSICK. [L. S.]